(12) United States Patent  
Jiang et al.

(10) Patent No.: US 8,815,367 B2
(45) Date of Patent: Aug. 26, 2014

(54) GRAPHENE/CARBON NANOTUBE COMPOSITE STRUCTURE

(75) Inventors: Kai-Li Jiang, Beijing (CN); Xiao-Yang Lin, Beijing (CN); Lin Xiao, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 282 days.

(21) Appl. No.: 13/337,064

(22) Filed: Dec. 24, 2011

(65) Prior Publication Data

US 2012/0251764 A1 Oct. 4, 2012

(30) Foreign Application Priority Data

Mar. 29, 2011 (CN) .......................... 2011 1 0076779

(51) Int. Cl.
*B32B 5/12* (2006.01)
*B32B 5/08* (2006.01)
*B32B 5/02* (2006.01)

(52) U.S. Cl.
USPC .... 428/113; 250/440.11; 428/105; 428/312.2

(58) Field of Classification Search
USPC .................. 428/113, 105, 312.2; 250/440.11; 977/742
See application file for complete search history.

(56) References Cited

U.S. PATENT DOCUMENTS

| 2010/0166232 | A1 | 7/2010 | Liu et al. |
| 2010/0260359 | A1 | 10/2010 | Liu |
| 2011/0017921 | A1* | 1/2011 | Jiang et al. ............... 250/440.11 |

FOREIGN PATENT DOCUMENTS

| CN | 101734650 | 6/2010 |
| CN | 101783995 | 7/2010 |
| CN | 101783996 | 7/2010 |
| CN | 101964292 | 2/2011 |
| JP | 2009-43939 | 2/2009 |
| JP | 2010-52972 | 3/2010 |
| JP | 2011-26194 | 2/2011 |

* cited by examiner

*Primary Examiner* — Brent O'Hern
(74) *Attorney, Agent, or Firm* — Novak Druce Connolly Bove + Quigg LLP

(57) ABSTRACT

A graphene/carbon nanotube composite structure includes a carbon nanotube film structure and a graphene film. The carbon nanotube film structure includes a number of carbon nanotubes. The carbon nanotubes form micropores. The graphene film is located on a surface of the carbon nanotube film structure. The graphene film covers the micropores.

19 Claims, 12 Drawing Sheets

GRAPHENE/CARBON NANOTUBE COMPOSITE STRUCTURE

CROSS-REFERENCE TO RELATED APPLICATIONS

This application claims all benefits accruing under 35 U.S.C. §119 from China Patent Application No. 201110076779.1, filed on Mar. 29, 2011, in the China Intellectual Property Office, the contents of which are hereby incorporated by reference.

BACKGROUND

1. Technical Field

The present disclosure relates to a graphene/carbon nanotube composite structure.

2. Description of Related Art

Graphene and carbon nanotubes are both allotropes of carbon. Graphene is a carbonaceous material composed of carbon atoms densely packed in a two dimensional honeycomb crystal lattice. Graphene has excellent electrical and thermal properties. An electron mobility of graphene at room temperature is about 15000 $cm^2V^{-1}s^{-1}$. A thermal conductivity of the graphene is about 3000 $Wm^{-1}K^{-1}$. A carbon nanotube has a hollow cylindrical nanostructure that can be formed by rolling the graphene. A composite film structure composed of the carbon nanotubes and the graphenes has received a great deal of interest because of the specific properties of the carbon nanotubes and graphenes. For example, a carbon nanotube can have a large length-to-diameter ratio and have excellent electrical, mechanical, and chemical properties.

Composite film structures composed of carbon nanotubes and graphenes can be created by a mixture of graphene fragments and carbon nanotube powder dispersed in a solvent. In the composite film structures, graphene is in the form of fragments, not as a complete layer structure. Thus, the conductivity and ductility of the composite film structure is much lower than a complete graphene layer. In addition, the carbon nanotubes are disorderly distributed in the composited film structure. Thus, light transmittance of the composite film structure is relatively low.

What is needed, therefore, is to provide a graphene/carbon nanotube composite structure having excellent conductivity, ductility, and light transmittance.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

FIG. 6 is an SEM image of one embodiment of a carbon nanotube structure of.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
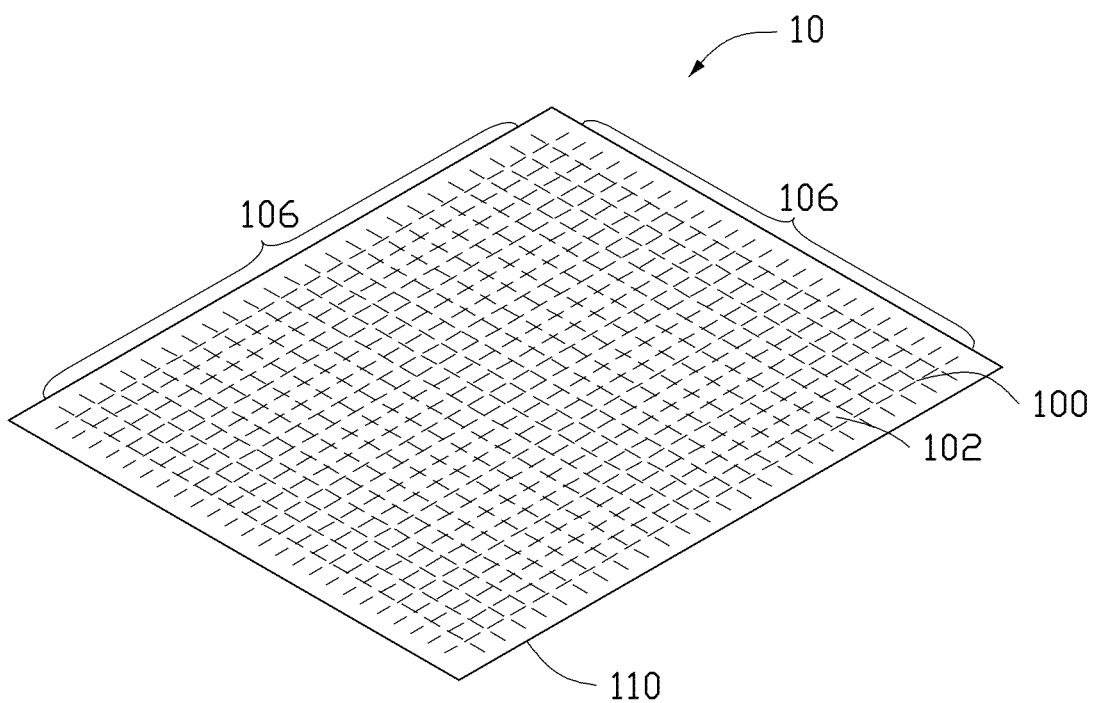
FIG. 1 is a schematic view of one embodiment of a graphene/carbon nanotube composite structure.

Referring to FIG. 1, in one embodiment, a graphene/carbon nanotube composite structure 10 includes a carbon nanotube film structure 100 and a graphene film 110 located on a surface of the carbon nanotube film structure 100. The carbon nanotube film structure 100 includes a plurality of micropores 102. The graphene film 110 covers the plurality of micropores 102.

Figure 2:
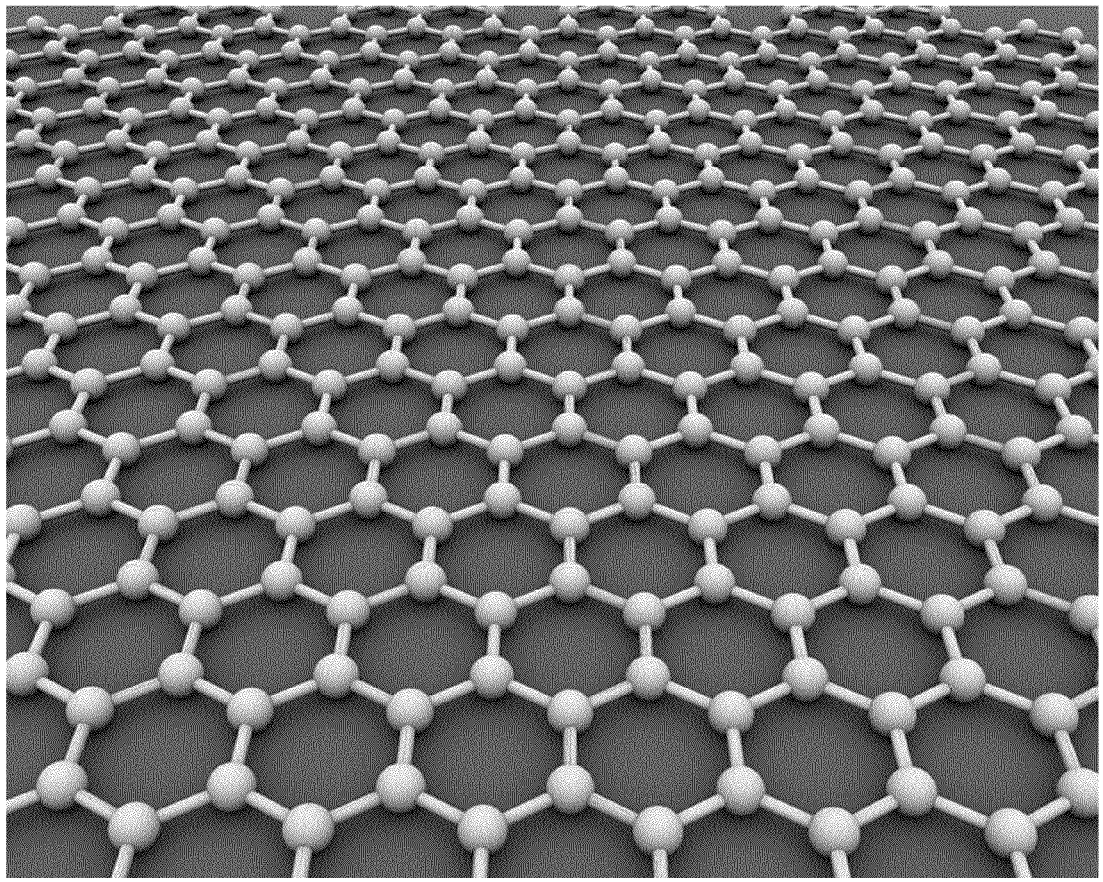
FIG. 2 is a view of a graphene structure.

The graphene film 110 is a two dimensional film structure. A thickness of the graphene film 110 can be in a range from about 0.34 nanometers to about 10 nanometers. The graphene film 110 can include at least one graphene layer. Referring to FIG. 2, the graphene layer is a one-atom thick sheet composed of a plurality of $sp^2$-bonded carbon atoms. If the graphene film 110 includes a plurality of graphene layers, the plurality of graphene layers can overlap each other to form a large area, or stack on top of each other to form a thick film. In one embodiment, the graphene film 110 has a single graphene layer. The graphene layer is a one-atom thick planar sheet composed of a plurality of $sp^2$-bonded carbon atoms. The graphene film 110 having one graphene layer has a high transmittance of 97.7%. A heat capacity of the graphene film 110 can be less than $2 \times 10^{-3}$ $J/cm^2 \cdot K$. In one embodiment, the heat capacity of the graphene film 110 having one graphene layer is less than $5.57 \times 10^{-7}$ $J/cm^2 \cdot K$. The graphene film 110 can be a free-standing structure. The term "free-standing structure" means that the graphene film 110 can sustain the weight of itself when it is hoisted by a portion thereof without any significant damage to its structural integrity. So, if the graphene film 110 is placed between two separate supports, a portion of the graphene film 110 not in contact with the two supports, would be suspended between the two supports and yet maintain structural integrity.

In one embodiment, the graphene film 110 grown on surface of a metal substrate by a chemical vapor deposition (CVD) method. Therefore, the graphene film 110 is an whole sheet structure having a flat planar shape located on the metal substrate having an area greater than 2 square centimeters ($cm^2$). In one embodiment, the grapheen film 110 is a square film with a phaving an area of 4 cm×4 cm square film.

The carbon nanotube film structure 100 has a sheet structure with a flat planar shape and comprises two opposite surfaces. The graphene film 110 can be only located on one of the two opposite surfaces of the carbon nanotube film structure 100.

The heat capacity per unit area of the carbon nanotube film structure 100 can be less than $2 \times 10^{-4}$ $J/cm^2 \cdot K$. In one embodiment, the heat capacity per unit area of the carbon nanotube film structure 100 is less than or equal to about $1.7 \times 10^{-6}$ J/cm$^2 \cdot$K. The carbon nanotube film structure 100 includes one or more drawn carbon nanotube films 106 stacked upon each other.

Figure 3:
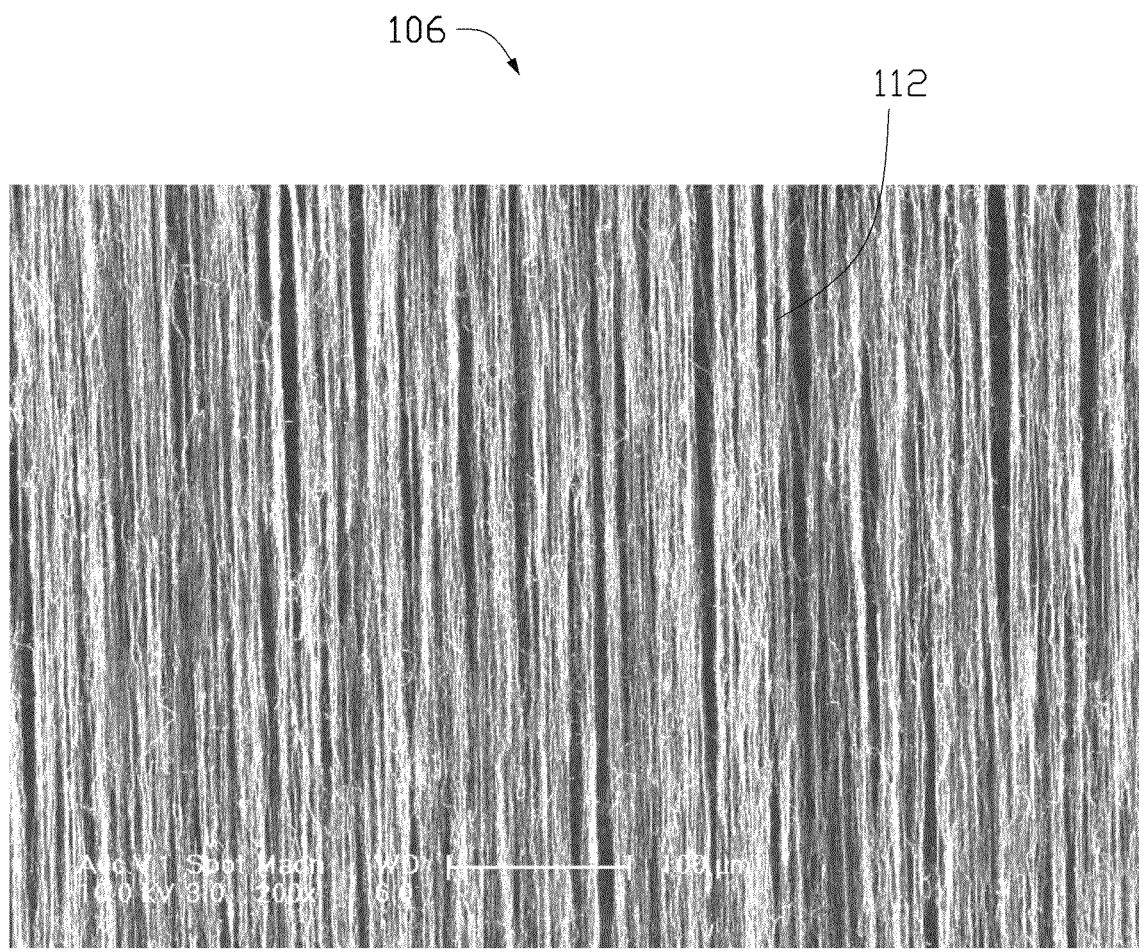
FIG. 3 is a Scanning Electron Microscopic (SEM) image of a drawn carbon nanotube film.

Referring to FIG. 3, the drawn carbon nanotube film 106 in the carbon nanotube film structure 100 includes a plurality of successive and oriented carbon nanotubes joined end-to-end by van der Waals attractive force therebetween. The carbon nanotubes in the drawn carbon nanotube film 106 can be substantially aligned in a single direction and substantially parallel to a surface of the drawn carbon nanotube film 106. A large number of the carbon nanotubes in the drawn carbon nanotube film 106 can be oriented along a preferred orientation, meaning that a large number of the carbon nanotubes in the drawn carbon nanotube film 106 are arranged substantially along the same direction. A small number of the carbon nanotubes are randomly arranged in the drawn carbon nanotube film 106, and have a negligible effect on the larger number of the carbon nanotubes in the drawn carbon nanotube film 106 arranged substantially along the same direction. A thickness of the drawn carbon nanotube film 106 can be in a range from about 0.5 nanometers to about 100 micrometers. The drawn carbon nanotube film 106 can be a freestanding structure, that is, drawn carbon nanotube film 106 can be supported by itself without a substrate.

Figure 4:
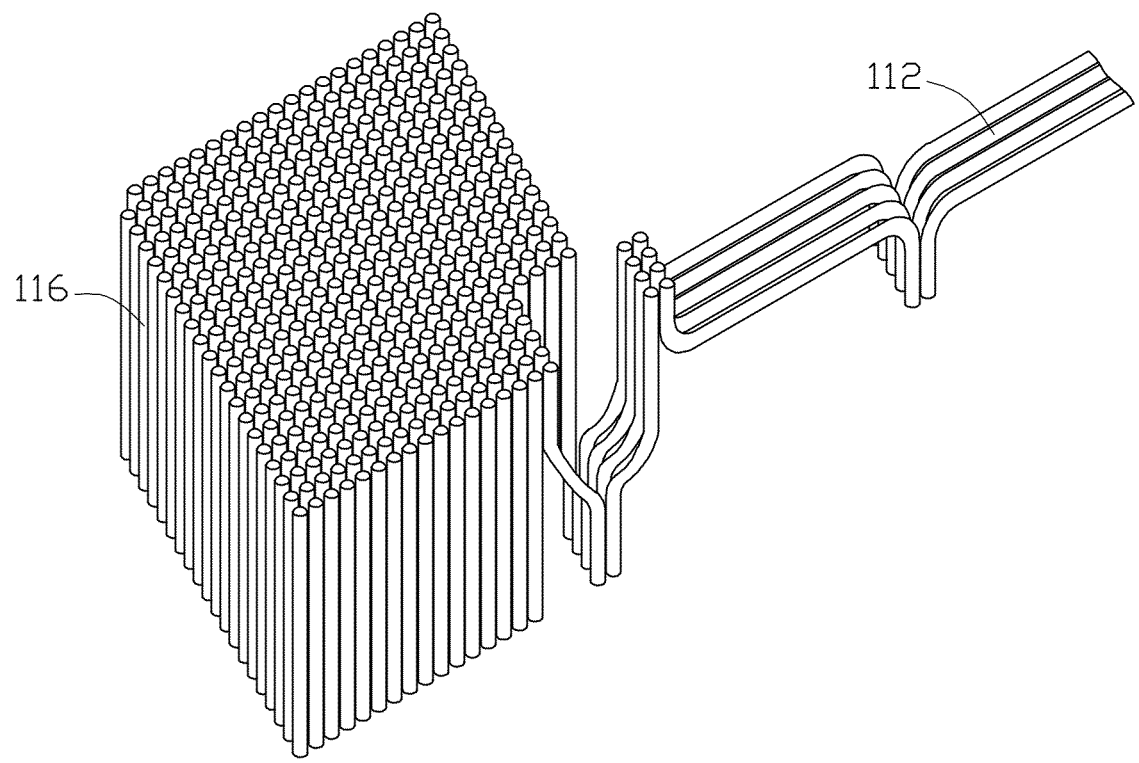
FIG. 4 is a schematic view of one embodiment of method of making the drawn carbon nanotube film in FIG. 3.

Referring to FIG. 4, the drawn carbon nanotube film 106 can be formed by drawing a film from a carbon nanotube array 116 using a pulling/drawing tool.

The carbon nanotube array 116 can be formed by a CVD method. The carbon nanotube array 116 is formed on a substrate, and includes a plurality of carbon nanotubes substantially perpendicular to the surface of the substrate. The carbon nanotube array 116 is essentially free of impurities such as carbonaceous or residual catalyst particles.

Figure 5:
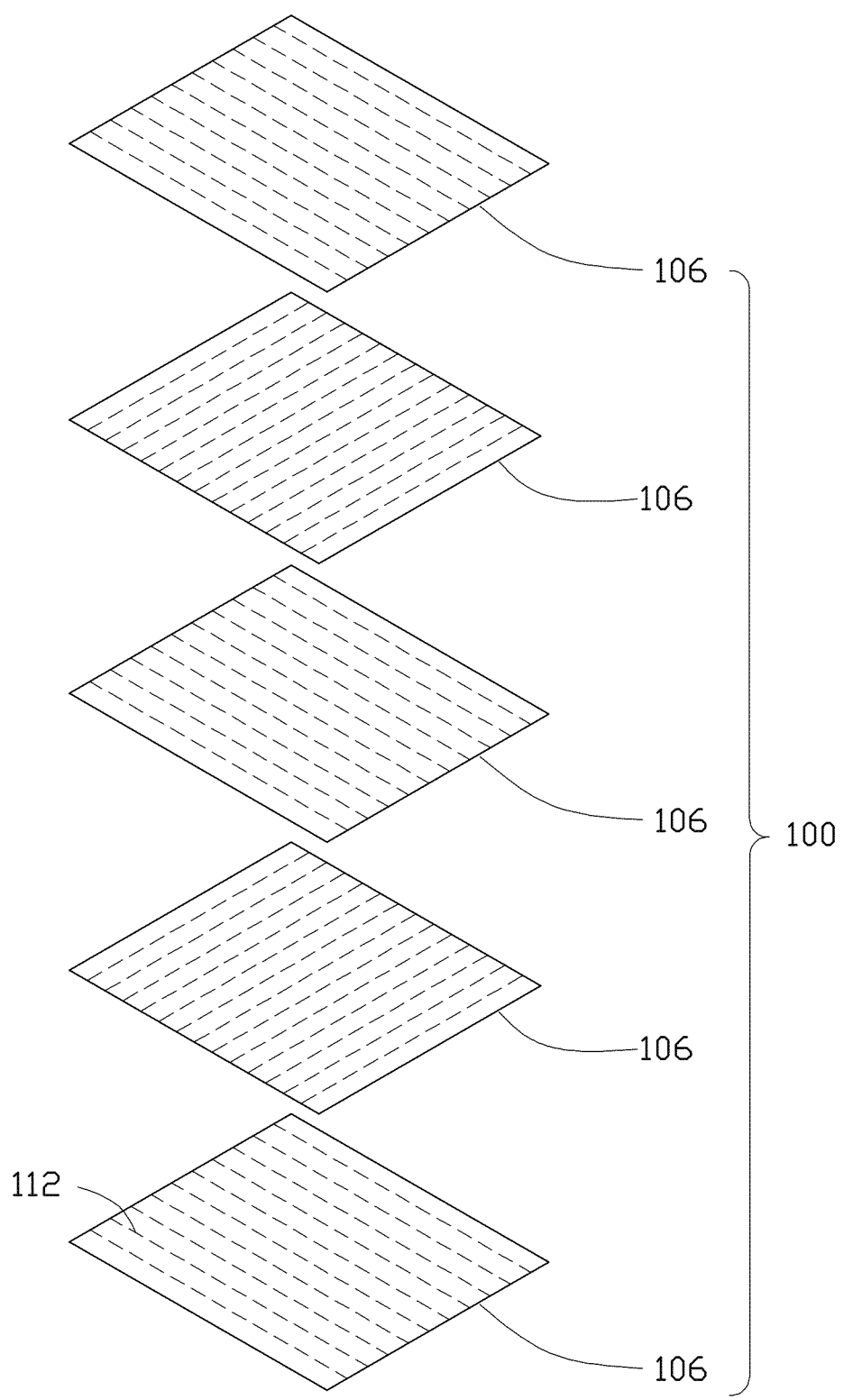
FIG. 5 is an exploded view of one embodiment of a carbon nanotube film structure shown with five stacked drawn carbon nanotube films.

Referring to FIG. 5, in one embodiment, the carbon nanotube film structure 100 includes five drawn carbon nanotube films 106 crossed and stacked with each other. An angle between the adjacent drawn carbon nanotube films 106 is not limited.

Figure 6:
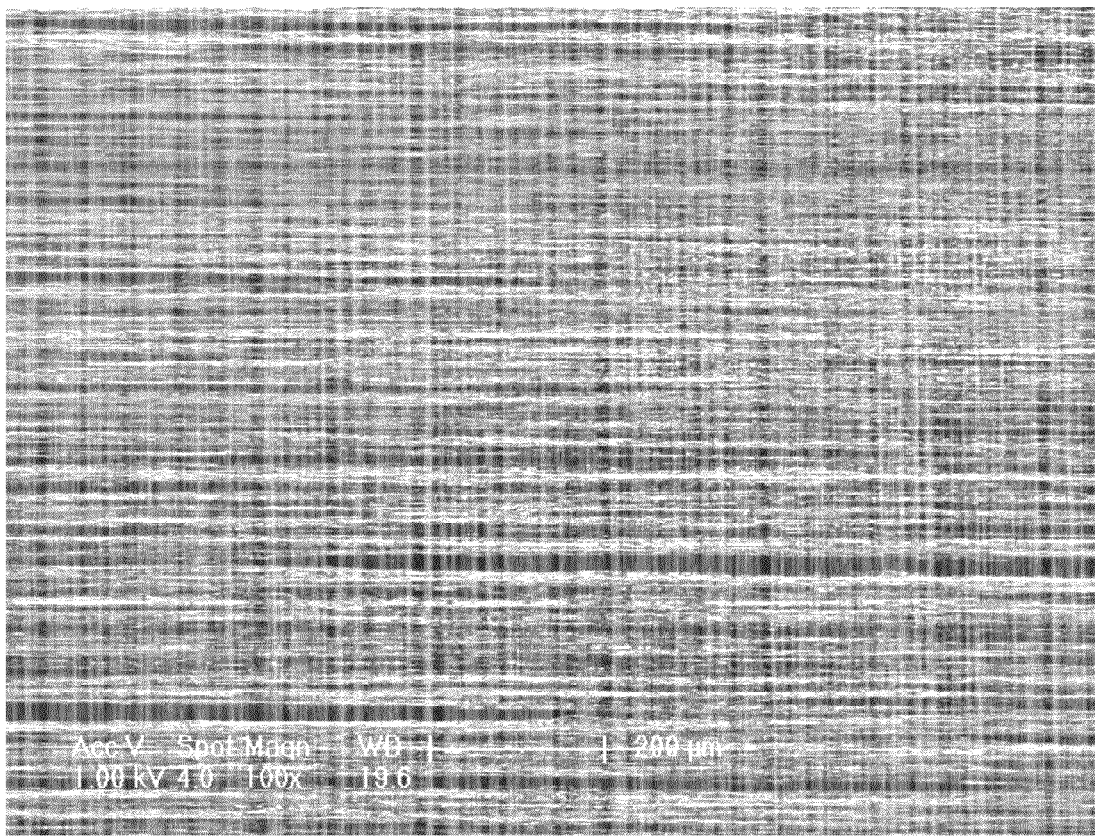

For example, two or more such drawn carbon nanotube films 106 can be stacked on each other on the frame to form a carbon nanotube film structure 100. An angle between the alignment axes of the carbon nanotubes in every two adjacent drawn carbon nanotube films 106 is not limited. Referring to FIG. 5 and FIG. 6, in one embodiment, the angle between the alignment axes of the carbon nanotubes in every two adjacent drawn carbon nanotube films 106 is about 90 degrees. The carbon nanotubes in every two adjacent drawn carbon nanotube films 106 are crossing each other, thereby providing the carbon nanotube film structure 100 with a microporous structure.

Figure 7:
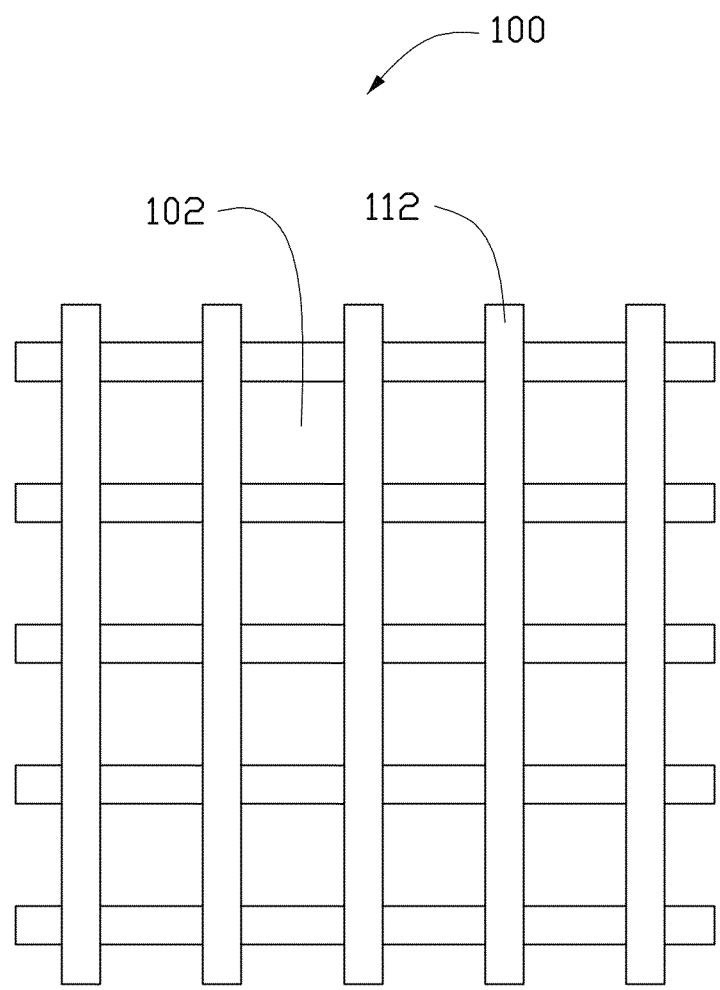
FIG. 7 is a schematic view of an enlarged portion of the carbon nanotube film structure in FIG. 6.

Referring to FIG. 7, because the drawn carbon nanotube film 106 includes a plurality of stripped gaps between the carbon nanotube segments 112 (shown in FIG. 3), the stripped gaps of the adjacent drawn carbon nanotube films 106 can cross each other, thereby forming a plurality of micropores 102 in the carbon nanotube film structure 100. A width of the stripped gaps is in a range from about 1 micrometer to about 10 micrometers. An average dimension of the plurality of micropores 102 is in a range from about 1 micrometer to about 10 micrometers. In one embodiment, the average dimension of the plurality of micropores 102 is greater than 5 micrometers. The graphene film 110 covers all of the plurality of micropores 102 of the carbon nanotube film structure 100.

To increase the dimension of the micropores 102 in the carbon nanotube film structure 100, the carbon nanotube film structure 100 can be treated with an organic solvent. After being soaked by the organic solvent, the carbon nanotube segments 112 in the drawn carbon nanotube film 106 of the carbon nanotube film structure 100 can at least partially shrink and collect or bundle together.

Figure 8:
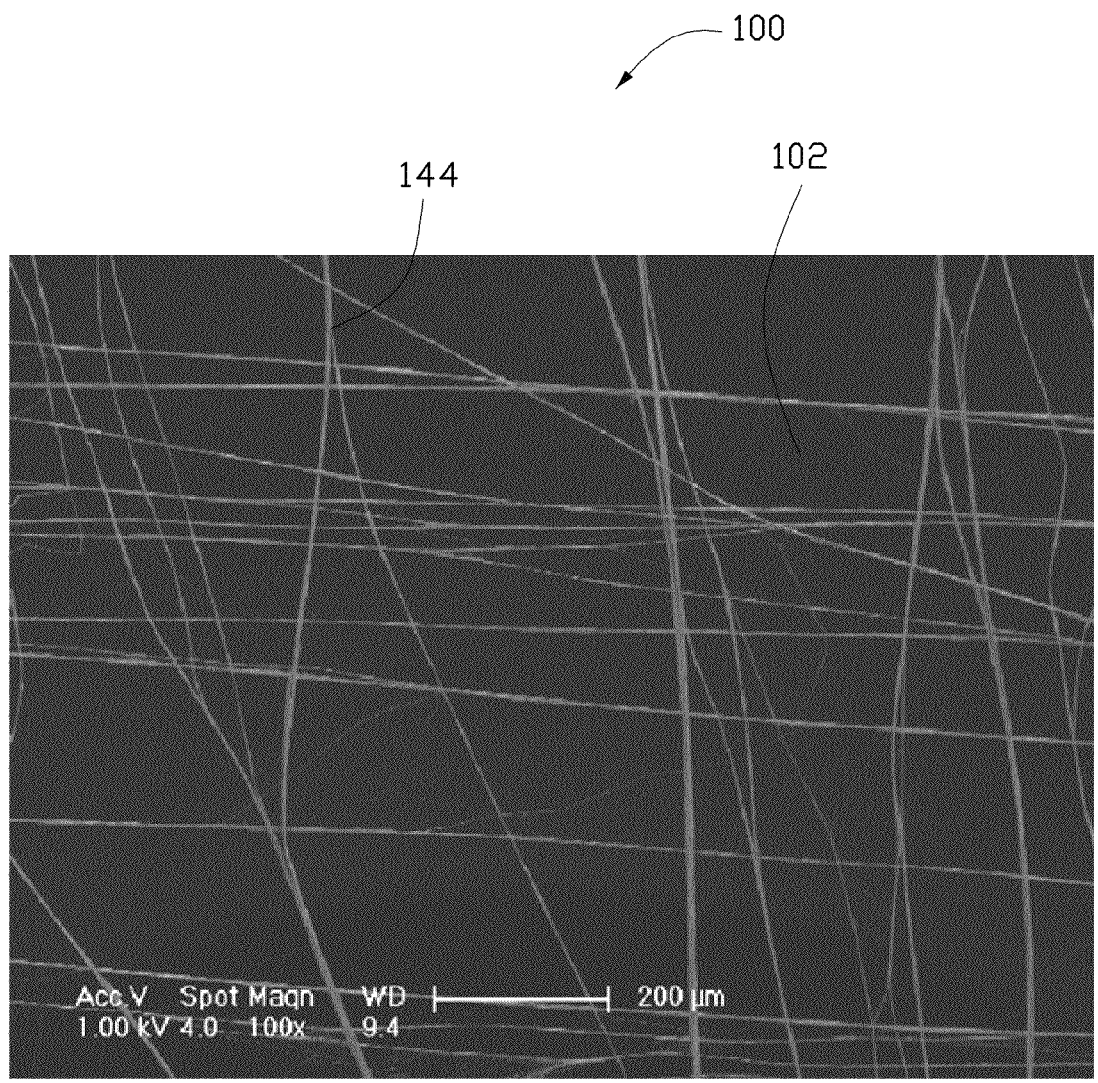
FIG. 8 is an SEM image of a carbon nanotube structure treated by a solvent.

Referring to FIG. 7 and FIG. 8, the carbon nanotube segments 112 in the drawn carbon nanotube film 106 of the carbon nanotube film structure 100 are joined end to end and aligned along a same direction. Thus, the carbon nanotube segments 112 would shrink in a direction perpendicular to the orientation of the carbon nanotube segments 112. If the drawn carbon nanotube film 106 is fixed on a frame or a surface of a supporter or a substrate, the carbon nanotube segments 112 would shrink into several large bundles or carbon nanotube strips 144. A distance between the adjacent carbon nanotube strips 144 is greater than the width of the gaps between the carbon nanotube segments 112 of the drawn carbon nanotube film 106. Referring to FIG. 8, due to the shrinking of the adjacent carbon nanotube segments 112 into the carbon nanotube strips 144, the parallel carbon nanotube strips 144 are relatively distant (especially compared to the initial layout of the carbon nanotube segments) to each other in one layer and cross with the parallel carbon nanotube strips 144 in each adjacent layer. A distance between the adjacent carbon nanotube strips 144 is in a range from about 10 micrometers to about 1000 micrometers. As such, the dimension of the micropores 102 is increased and can be in a range from about 10 micrometers to about 1000 micrometers. Due to the decrease of the specific surface via bundling, the coefficient of friction of the carbon nanotube film structure 100 is reduced, but the carbon nanotube film structure 100 maintains high mechanical strength and toughness. A ratio of an area of the plurality of micropores of the carbon nanotube film structure 100 is in a range from about 10:11 to about 1000:1001.

The organic solvent is volatilizable and can be ethanol, methanol, acetone, dichloroethane, chloroform, or any combinations thereof.

To increase the dimension of the micropores 102 in the carbon nanotube film structure 100, the drawn carbon nanotube films 106 can be treated with a laser beam before stacking upon each other to form the carbon nanotube film structure 100.

The laser beam treating method includes fixing the drawn carbon nanotube film 106 and moving the laser beam at an even/uniform speed to irradiate the drawn carbon nanotube film 106, thereby forming a plurality of carbon nanotube strips 144. A laser device used in this process can have a power density greater than $0.1 \times 10^4$ W/m$^2$.

The laser beam is moved along a direction in which the carbon nanotubes are oriented. The carbon nanotubes absorb energy from laser irradiation and the temperature thereof is increased. Some of the carbon nanotubes in the drawn carbon nanotube film 106 will absorb excess energy and be destroyed. When the carbon nanotubes along the orientation of the carbon nanotubes in the drawn carbon nanotube film 140 are destroyed from absorbing excess laser irradiation energy, a plurality of carbon nanotube strips 144 is formed substantially parallel with each other. A distance between the adjacent carbon nanotube strips 144 is in a range from about 10 micrometers to about 1000 micrometers. A gap between the adjacent carbon nanotube strips 144 is in a range from about 10 micrometers to about 1000 micrometers. A width of the plurality of carbon nanotube strips 144 can be in a range from about 100 nanometers to about 10 micrometers.

Figure 9:
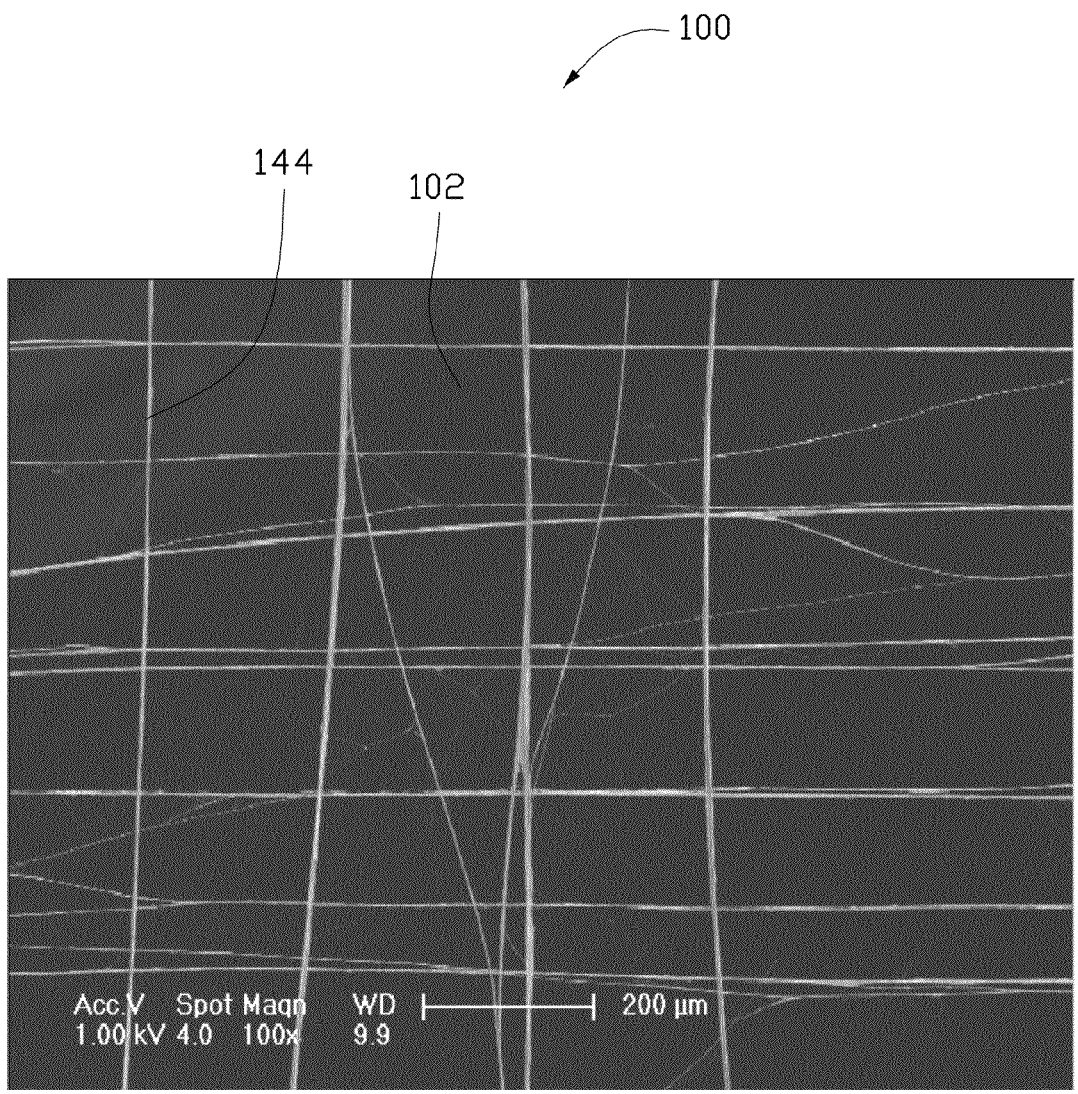
FIG. 9 is an SEM image of a carbon nanotube structure made by drawn carbon nanotube films treated by a laser.

Referring to FIG. 9, in one embodiment, a carbon nanotube film structure 100 is formed by stacking two laser treated drawn carbon nanotube films 106. The carbon nanoutbe film structure 14 includes a plurality of carbon nanotube strips 144 crossed with each other and forming a plurality of micropores 102. An average dimension of the micropores is in a range from about 200 micrometers to about 400 micrometers.

The carbon nanotube film structure 100 can be put on the graphene film 110 and cover the graphene film 110. The carbon nanotube film structure 100 and the graphene film 110 can be stacked together by mechanical force. A polymer solution can be located on the graphene film 110 before putting the at least one carbon nanotube film structure 100 on the graphene film 110 to help combine the carbon nanotube film structure 100 and the graphene film 110.

The polymer solution can be formed by dissolving a polymer material in an organic solution. In one embodiment, the viscosity of the solution is greater than 1 Pa-s. The polymer material can be a solid at room temperature, and can be transparent. The polymer material can be polystyrene, polyethylene, polycarbonate, polymethyl methacrylate (PMMA), polycarbonate (PC), terephthalate (PET), benzo cyclo butene (BCB), or polyalkenamer. The organic solution can be ethanol, methanol, acetone, dichloroethane or chloroform. In one embodiment, the polymer material is PMMA, and the organic solution is ethanol.

Because the drawn carbon nantoube film 106 has a good adhesive property, the plurality of drawn carbon nanotube films 106 can be directly located on the graphene film 110 step by step and crossed with each other. Therefore, the carbon nanotube film structure 100 is formed directly on the graphene film 110. Furthermore, an organic solvent can be dropped on the carbon nanotube film structure 100 to increase the dimension of the microspores 102 in the carbon nanotube film structure 100.

The graphene/carbon nanotube composite structure 10 can include two graphene films 110 separately located on two opposite surfaces of the carbon nanotube film structure 100.

Figure 10:
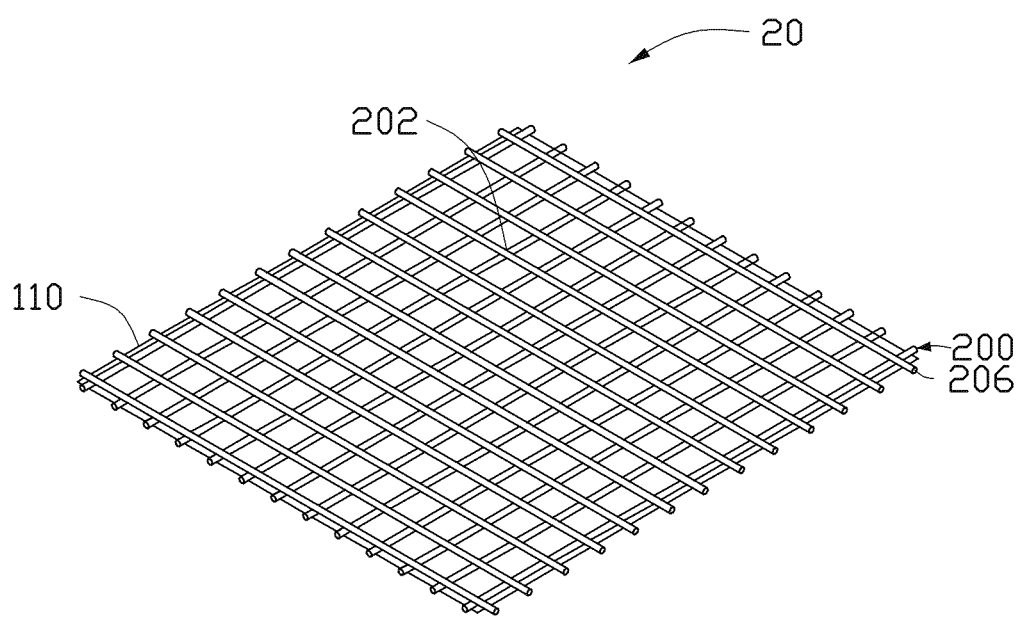
FIG. 10 is a schematic view of another embodiment of a graphene/carbon nanotube composite structure.

Referring to FIG. 10, in another embodiment, a graphene/carbon nanotube composite structure 20 includes a carbon nanotube film structure 200 and a graphene film 110 located on a surface of the carbon nanotube film structure 200.

The carbon nanotube film structure 200 includes a plurality of carbon nanotube wires 206 crossed with each other thereby forming a network. The carbon nanotube film structure 200 includes a plurality of micropores 202. In one embodiment, the plurality of carbon nanotube wires 206 is divided into two parts. The first parts of the plurality of carbon nanotube wires 206 are substantially parallel to and spaced with each other, and a first gap is formed between the adjacent first parts of the plurality of carbon nanotube wires 206. The second parts of the plurality of carbon nanotube wires 206 are substantially parallel to and spaced with each other, and a second gap is formed between the adjacent second parts of the plurality of carbon nanotube wires 206. A width of the first or the second parts of the plurality of carbon nanotube wires 206 is in a range from about 10 micrometers to about 1000 micrometers. The first and the second parts of the plurality of carbon nanotube wires 206 are crossed with each other, and an angle is formed between the first and the second parts of the plurality of carbon nanotube wires 206. In one embodiment, the angle between the axes of the first and the second parts of the plurality of carbon nanotube wires 206 is about 90 degrees. A diameter of the plurality of micropores 202 can be in a range from about 10 micrometers to about 1000 micrometers.

The carbon nanotube wires 206 can be twisted carbon nanotube wires, or untwisted carbon nanotube wires.

Figure 11:
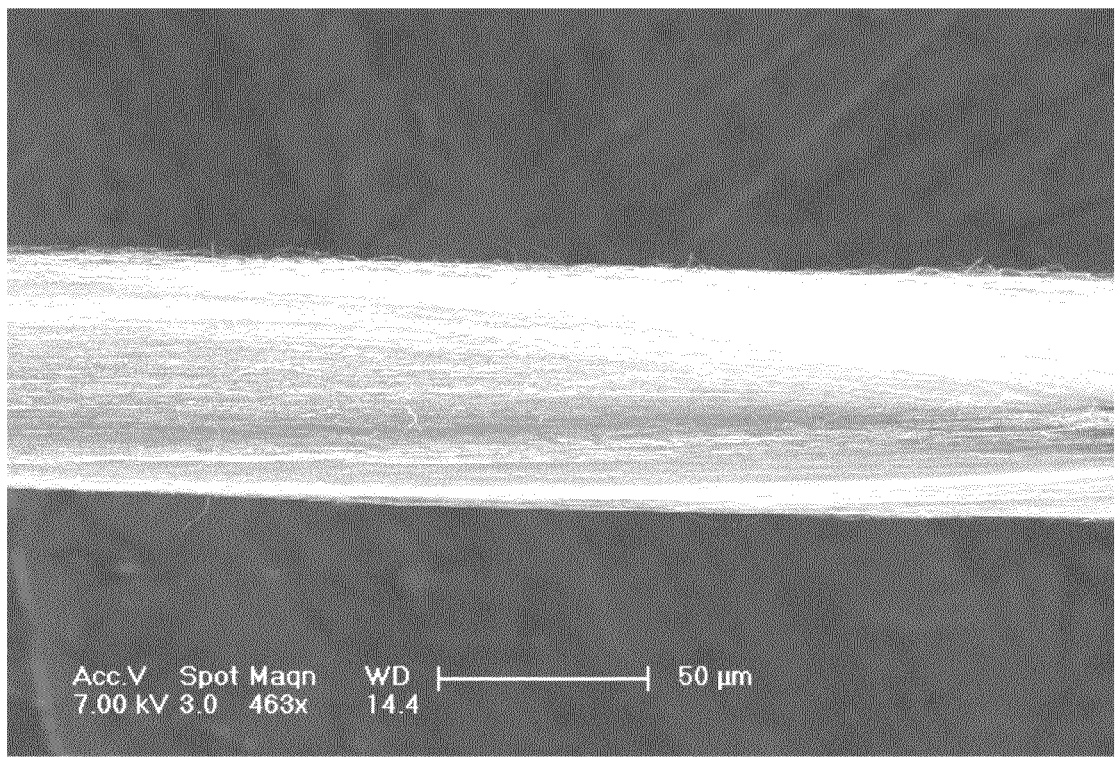
FIG. 11 is an SEM image of an untwisted carbon nanotube wire.

The untwisted carbon nanotube wire can be formed by treating the drawn carbon nanotube film 106 with a volatile organic solvent. Specifically, the drawn carbon nanotube film 106 is treated by applying the organic solvent to the drawn carbon nanotube film 106 to soak the entire surface of the drawn carbon nanotube film 106. After being soaked by the organic solvent, the adjacent paralleled carbon nanotubes in the drawn carbon nanotube film 106 will bundle together, due to the surface tension of the organic solvent as the organic solvent volatilizes, and thus, the drawn carbon nanotube film 106 will be shrunk into untwisted carbon nanotube wire. Referring to FIG. 11, the untwisted carbon nanotube wire includes a plurality of carbon nanotubes substantially oriented along a same direction (e.g., a direction along the length of the untwisted carbon nanotube wire). The carbon nanotubes are substantially parallel to the axis of the untwisted carbon nanotube wire. The length of the untwisted carbon nanotube wire can be set as desired. The diameter of an untwisted carbon nanotube wire can range from about 1 micrometer nanometers to about 10 micrometers. In one embodiment, the diameter of the untwisted carbon nanotube wire is about 5 micrometers. Examples of the untwisted carbon nanotube wire is taught by U.S. Patent Application Publication U.S. 2007/0166223 to Jiang et al.

Figure 12:
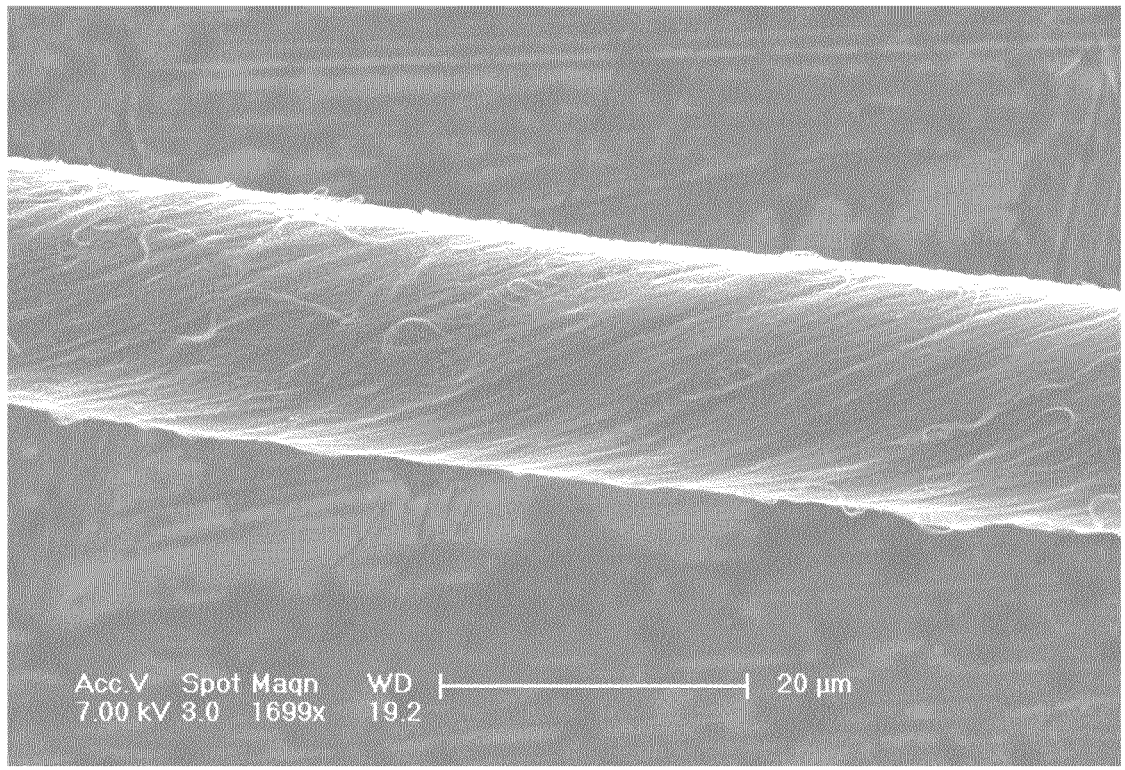
FIG. 12 is an SEM image of a twisted carbon nanotube wire.

The twisted carbon nanotube wire can be formed by twisting a drawn carbon nanotube film 106 by using a mechanical force to turn the two ends of the drawn carbon nanotube film 106 in opposite directions. Referring to FIG. 12, the twisted carbon nanotube wire includes a plurality of carbon nanotubes oriented around an axial direction of the twisted carbon nanotube wire. The carbon nanotubes are aligned around the axis of the carbon nanotube twisted wire like a helix. The length of the carbon nanotube wire can be set as desired. The diameter of the twisted carbon nanotube wire can range from about 0.5 nanometers to about 100 micrometers. Further, the twisted carbon nanotube wire can be treated with a volatile organic solvent, before or after being twisted. After being soaked by the organic solvent, the adjacent paralleled carbon nanotubes in the twisted carbon nanotube wire will bundle together. The specific surface area of the twisted carbon nanotube wire will decrease. The density and strength of the twisted carbon nanotube wire will be increased. The twisted and untwisted carbon nanotube cables can be produced by methods that are similar to the methods of making twisted and untwisted carbon nanotube wires.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A graphene/carbon nanotube composite structure comprising:
   a carbon nanotube film structure comprising a plurality of carbon nanotubes and micropores;
   a graphene film located on a surface of the carbon nanotube film structure, and covering substantially all of the plurality of micropores, wherein the graphene film is supported by the carbon nanotube film structure, the graphene film and the carbon nanotube film structure are combined together via a polymer material sandwiched between the graphene film and the carbon nanotube film structure.

2. The graphene/carbon nanotube composite structure of claim 1, wherein a diameter of the plurality of micropores is in a range from about 1 micrometer to about 10 micrometers.

3. The graphene/carbon nanotube composite structure of claim 2, wherein the graphene film has an area greater than 2 cm$^2$.

4. The graphene/carbon nanotube composite structure of claim 1, wherein the carbon nanotube film structure comprises at least two crossed stacked drawn carbon nanotube films, each of the drawn carbon nanotube films comprises a plurality of carbon nanotubes joined end-to-end by Van der Waals attractive forces, and substantially oriented along a same direction.

5. The graphene/carbon nanotube composite structure of claim 4, wherein each of the drawn carbon nanotube films has a thickness in a range from about 0.01 microns to about 100 microns.

6. The graphene/carbon nanotube composite structure of claim 4, wherein each of the drawn carbon nanotube films comprises a plurality of stripped gaps.

7. The graphene/carbon nanotube composite structure of claim 6, wherein a width of the plurality of stripped gaps is in a range from about 1 micrometer to about 10 micrometers.

8. The graphene/carbon nanotube composite structure of claim 4, wherein each of the drawn carbon nanotube films comprises a plurality of carbon nanotube strips spaced with each other.

9. The graphene/carbon nanotube composite structure of claim 8, wherein a distance between adjacent carbon nanotube strips of the plurality of carbon nanotube strips is in a range from about 10 micrometers to about 1000 micrometers.

10. The graphene/carbon nanotube composite structure of claim 9, wherein a ratio of an area of the plurality of micropores to the carbon nanotube film structure is in a range from about 10:11 to about 1000:1001.

11. The graphene/carbon nanotube composite structure of claim 1, wherein a thickness of the graphene film is in a range from about 0.34 nanometers to about 10 nanometers.

12. The graphene/carbon nanotube composite structure of claim 1, wherein the graphene film is only one layer of graphene, having an area of about 16 cm$^2$.

13. The graphene/carbon nanotube composite structure of claim 1, wherein the carbon nanotube structure has a flat planar shape and comprises two opposite surfaces, the graphene film locates on one of the two opposite surface, a ratio of an area of the plurality of micropores to the carbon nanotube film structure is in a range from about 10:11 to about 1000:1001.

14. The graphene/carbon nanotube composite structure of claim 1, wherein the polymer material is polystyrene, polyethylene, polycarbonate, polymethyl methacrylate (PMMA), polycarbonate (PC), terephthalate (PET), benzo cyclo butene (BCB), or polyalkenamer.

15. The graphene/carbon nanotube composite structure of claim 12, wherein a thickness of the graphene film is in a range from about 0.34 nanometers to about 10 nanometers.

16. The graphene/carbon nanotube composite structure of claim 12, wherein the polymer material is polystyrene, polyethylene, polycarbonate, polymethyl methacrylate (PMMA), polycarbonate (PC), terephthalate (PET), benzo cyclo butene (BCB), or polyalkenamer.

17. A graphene/carbon nanotube composite structure comprising:
a carbon nanotube film structure comprising a plurality of micropores and a plurality of carbon nanotube wires crossed with each other thereby forming a network;
a graphene film directly contacting a surface of the carbon nanotube film structure, and covering the plurality of micropores, wherein a first part of the plurality of carbon nanotube wires is spaced with and substantially parallel to each other, and a second part of the plurality of carbon nanotube wires is spaced with and parallel to each other, the first and the second parts of the plurality of carbon nanotube wires are crossed with each other, the graphene film and the carbon nanotube film structure are combined together via a polymer material sandwiched between the graphene film and the carbon nanotube film structure.

18. The graphene/carbon nanotube composite structure of claim 17, wherein a diameter of the plurality of micropores is in a range from about 10 micrometer to about 1000 micrometers.

19. The graphene/carbon nanotube composite structure of claim 17, wherein the plurality of carbon nanotube wires are twisted carbon nanotube wires comprising a plurality of carbon nanotubes oriented around an axial direction of the twisted carbon nanotube wires.

* * * * *